(12) United States Patent
Kishek

(10) Patent No.: US 7,024,876 B1
(45) Date of Patent: Apr. 11, 2006

(54) PORTABLE COOLING UNIT

(76) Inventor: James Kishek, 23 Aguilar, Irvine, CA (US) 92614

( * ) Notice: Subject to any disclaimer, the term of this patent is extended or adjusted under 35 U.S.C. 154(b) by 327 days.

(21) Appl. No.: 10/237,296

(22) Filed: Sep. 9, 2002

(51) Int. Cl.
F25B 27/00 (2006.01)

(52) U.S. Cl. .............................. 62/236; 62/244; 236/51
(58) Field of Classification Search ................... 236/51; 62/236, 89, 177, 244, 407, 448; 165/41; 454/75
See application file for complete search history.

(56) References Cited

U.S. PATENT DOCUMENTS

| | | | |
|---|---|---|---|
| 3,884,130 A | 5/1975 | Wahnish | 62/133 |
| 4,463,569 A | 8/1984 | McLarty | 62/3 |
| 4,899,645 A * | 2/1990 | Wolfe et al. | 454/131 |
| 4,909,044 A * | 3/1990 | Gudmundsen | 62/236 |
| 4,942,806 A * | 7/1990 | Hwang | 454/162 |
| 4,986,169 A * | 1/1991 | Chen | 454/131 |
| 5,148,736 A * | 9/1992 | Juang | 454/131 |
| 5,687,573 A * | 11/1997 | Shih | 62/3.6 |
| 5,791,407 A * | 8/1998 | Hammons | 165/202 |
| 5,950,710 A | 9/1999 | Liu | 165/41 |
| 6,030,285 A * | 2/2000 | Chen | 454/75 |
| 6,422,030 B1 * | 7/2002 | Calvert | 62/314 |
| 6,626,003 B1 * | 9/2003 | Kortum et al. | 62/235.1 |
| 6,669,556 B1 * | 12/2003 | Gautney | 454/338 |

* cited by examiner

Primary Examiner—Marc Norman
(74) Attorney, Agent, or Firm—Goldstein Law Offices, P.C.

(57) ABSTRACT

A portable cooling unit for cooling the interior of an automobile, comprising a cooling device and an associated remote control unit. The cooling device has a number of solar cell panels located on its upper surface for converting the rays of sunlight into electrical energy. The cooling device may also be powered by batteries. Warm air from the inside of the automobile enters an air inlet vent on the cooling device, is cooled therein by a cooling means, and is released at an air outlet vent. A remote sensor located on the side of the cooling device allows the cooling device to be activated from outside of the vehicle by a remote control unit. A power mode switch located on the cooling device allows a choice of powering the unit either by energy from solar cell panels or by the batteries contained within the cooling device.

7 Claims, 3 Drawing Sheets

PORTABLE COOLING UNIT

BACKGROUND OF THE INVENTION

1. Field of the Invention

The present invention relates to a portable cooling unit which may be placed inside of an automobile near the back window which functions to cool the automobile when it is parked, and which is switchable so that it is selectively powered by batteries or by solar cells. The device is operable by a remote control unit which may be carried by a user for operating the cooling unit while outside the vehicle.

2. Description of the Related Art

During periods of warm weather, the temperature inside of the passenger compartment of an automobile which is parked may often rise rapidly. When the vehicle is parked in the sunlight this problem is compounded, and temperatures may often rise to uncomfortable and even dangerous levels—even after a very short period of time. However, when the automobile has been parked, the air conditioning system, which is capable of being turned on only when the engine is on, is rendered inoperable.

Various devices have been created which may be used for heating or cooling an enclosed space. U.S. Pat. No. 4,463,569 to McLarty appears to show a combined electrical heating and cooling device comprised of an inlet duct and fan for passing air over a reversible heat sink. However, McLarty appears to contemplate improvements on existing thermoelectric modules in order to avoid the use of freon. Furthermore, its electrical circuitry is highly complex, yet McLarty does not address the problems and pitfalls associated with cooling the interior of a parked automobile.

U.S. Pat. No. 3,844,130 to Wahnish appears to show a thermostat controlled auxiliary air conditioner system for cooling the interior of a vehicle, for use when the primary power is not in use. However, Wahnish appears to contemplate an auxiliary system which is integral to the automobile, and is positioned in the engine compartment, even if independent of the automobile drive means for driving the air conditioning system. Thus, this system lacks portability and simplicity of construction, and is not easily integrated with existing automobiles.

U.S. Pat. No. 5,950,710 to Lui appears to show a means for regulating the temperature in a passenger vehicle. However, Liu appears to describe a device aimed primarily at utilizing a phase-change working substance to release latent heat of condensation to the ambient air, and is aimed primarily at avoiding the consumption of any "man-made" power.

While these units may be suitable for the particular purpose employed, or for general use, they would not be as suitable for the purposes of the present invention as disclosed hereafter.

SUMMARY OF THE INVENTION

It is an object of the invention to provide a cooling unit which may be easily moved to a desired position in an automobile, and which is not unduly large or heavy. Accordingly, the portable cooling unit described is small and lightweight, and may be easily moved to and from its desired location, preferably near the window adjacent to the back seat, by the average adult.

It is a further object of this invention to provide a cooling device which is capable of being activated and deactivated even from the outside of the automobile. Accordingly, this device includes a remote control unit, whereby the user may turn on the cooling system, which is equipped with a remote sensor, even from locations that are remote from the automobile.

It is yet a further object of this invention to provide a device which is able to cool an automobile by the use of solar power, when there is enough sunlight to provide a sufficient quantity of electrical current to power the cooling device. Accordingly, this device is equipped with solar cells on its top surface, and is capable of being powered by sunlight when ambient lighting conditions so permit.

It is yet another object of this invention to provide a unit which may cool the interior of an automobile even when there is little or no sunlight. Accordingly, this device is equipped with a power mode switch which allows the user to power the unit with batteries when the level of sunlight is too low for the solar cells to generate sufficient power.

It is still yet a further object of this invention to maximize the lifetime of the batteries which are used to power the portable cooling unit. Accordingly, the batteries are capable of being recharged by sunlight, after the light energy has been converted to electrical energy by the solar cells.

The invention is a portable cooling unit for cooling the interior of a parked automobile comprising a cooling device and an associated remote control unit. The cooling device has a number of solar cell panels located on its upper surface for converting the rays of sunlight into electrical energy. The cooling device has an air inlet vent and an air outlet vent. Warm air from the inside of the automobile enters the air inlet vent, is cooled therein by a cooling means, and is released at the air outlet vent. A remote sensor located on the side of the cooling device may be activated from outside the vehicle using a remote control unit. A switch located on the cooling device allows a choice between powering the unit by energy from the solar cell panels which are located on the top surface of the cooling device or by energy from the rechargeable batteries contained within the cooling device.

In use, the cooling device is located on a convenient flat surface of an automobile. The user positions the cooling device to ensure that its inlet and outlet vents are unobstructed so that air flow to and from the device is unimpeded. Furthermore, if there is enough sunlight to power the device via the solar cell panels located on its top surface, the user positions the device so as to maximize absorption of this sunlight. The user decides whether to power the device by the solar cell panels, or by batteries, and positions the switch on the unit accordingly. The user may then activate the device while inside of the vehicle via the remote control unit, or may carry the remote control unit upon leaving the vehicle, and activate and deactivate the cooling device from outside of the vehicle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
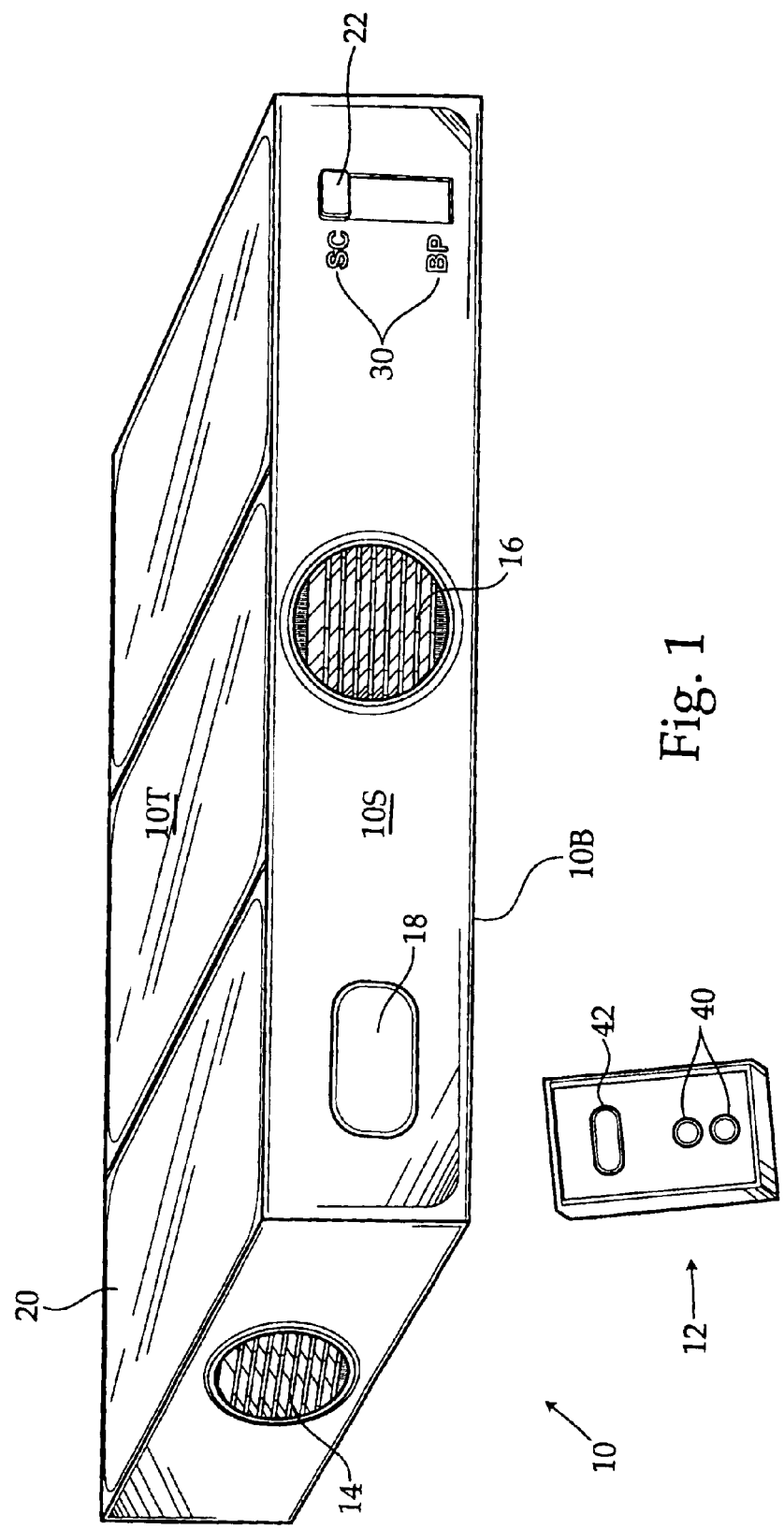
FIG. 1 is a perspective view of the cooling device and its associated remote control unit, which together comprise the portable cooling unit.

FIG. 1 illustrates the portable cooling unit, which is comprised of a cooling device 10 and an associated remote control unit 12. The cooling device 10 has a number of solar cell panels 20 located on its upper surface 10T for converting the rays of sunlight into electrical energy. The cooling device 10 is equipped with an air inlet vent 14 and an air outlet vent 16. Warm air from the inside of the automobile enters the air inlet vent 14, is cooled therein by a cooling means, and is released at the air outlet vent 16. It should be noted that to operate effectively, any cooling device must discharge the heat removed from the cooled air. Accordingly, this heat may be extracted from the air using a freon-based refrigeration system and discharged outside of the vehicle or absorbed by a medium which is suitable for this purpose. A remote sensor 18 located on the side 10S of the cooling device 10 allows the cooling device 10 to be activated from outside the vehicle by the remote control unit 12. A power mode switch 22 located on the side 10S of the cooling device 10 allows a choice of powering the unit either by the solar cell panels 20 which are located on the top surface 10T of the cooling device 10, or by rechargeable batteries contained within the cooling device 10. Indicia 30 indicate which position of the switch corresponds to powering the cooling device by the solar cells, and which position corresponds to battery-operation. In FIG. 1, these switch positions have been labeled SC, for 'solar cell' powering, and BP, for 'battery powering'.

Figure 2:
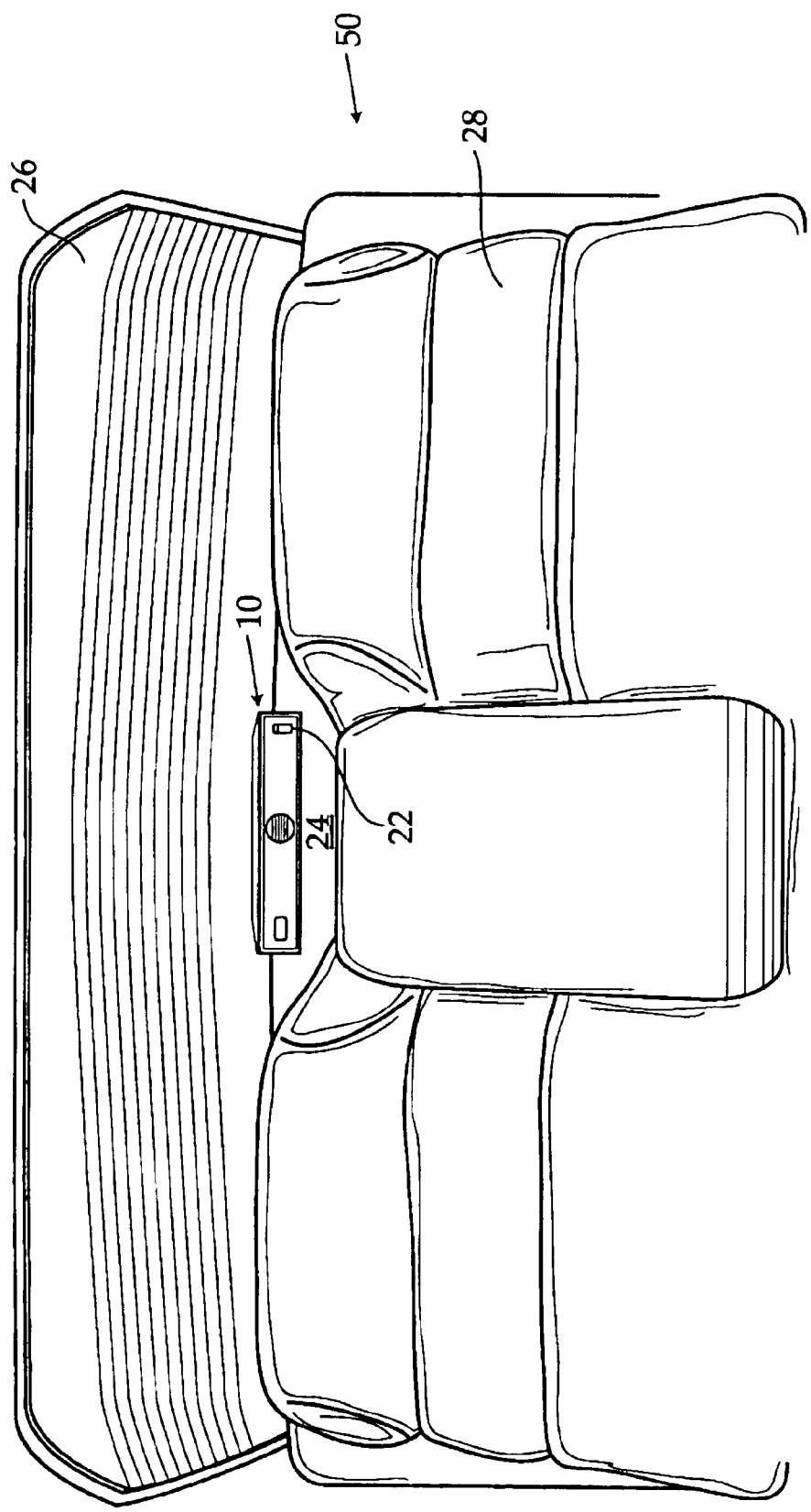
FIG. 2 is a perspective view of the inside of an automobile with the cooling device located below the rear window.

FIG. 2 is a view of an automobile 50, having an inside and having a rear window 26, a windowsill 24 located immediately below the rear window 26, and back seat 28 immediately in front of the windowsill 24. As illustrated, the cooling device 10 is located on the windowsill 24 below the rear window 26. The cooling device 10 can be easily moved to various positions on the windowsill 24 by a passenger seated in the back seat 28 of the automobile 50. The passenger also has easy access to the power mode switch 22 which allows a choice of solar cell powering or battery powering of the cooling device 10.

Figure 3:
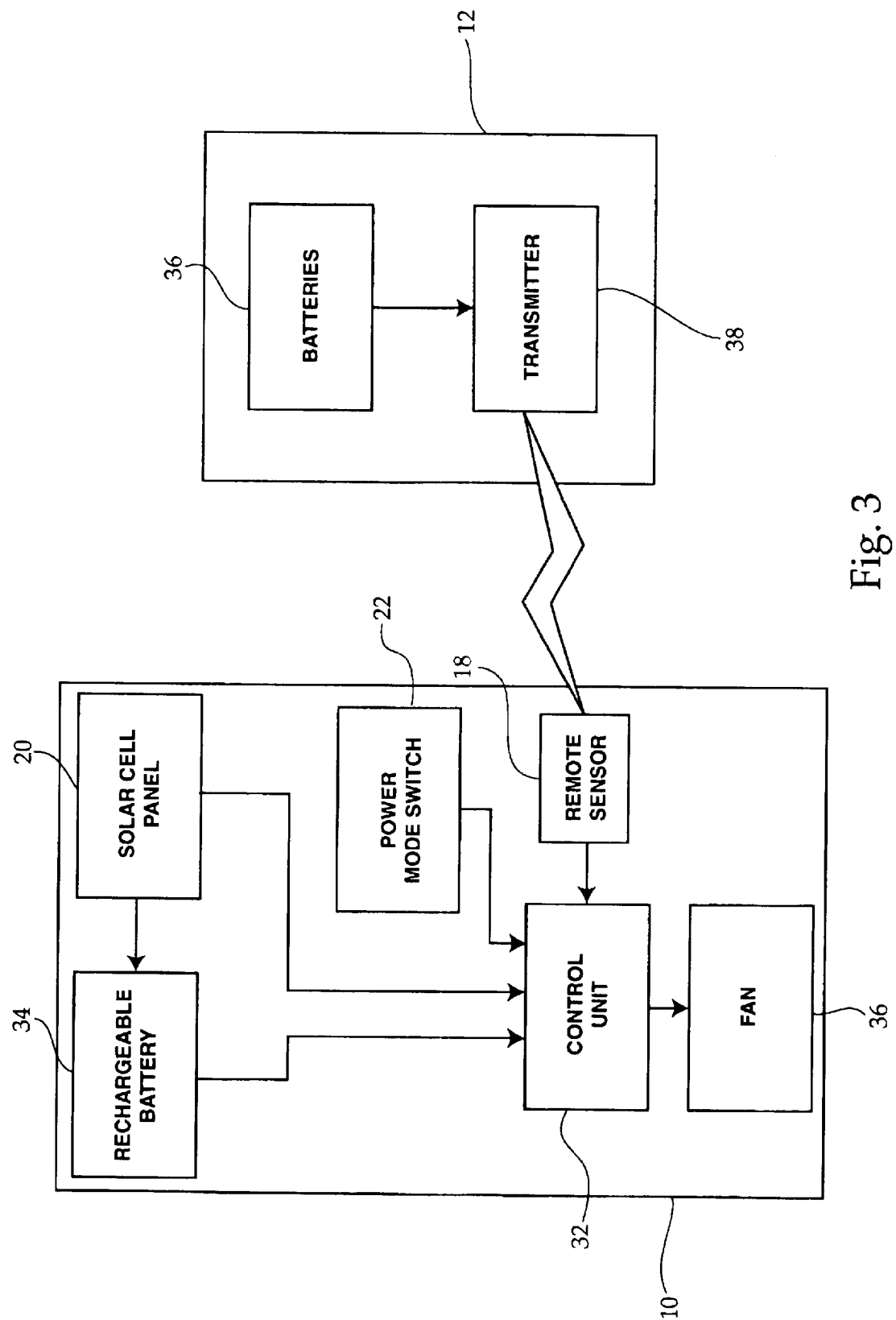
FIG. 3 is a block diagram illustrating the interconnection of various electrical components of the invention.

FIG. 3 is a block diagram illustrating interconnection of various electrical components of the invention. In particular, it illustrates the interconnection between the remote control unit 12 and the cooling device 10 and it indicates the various components of each. As the diagram of the cooling device 10 indicates, the solar cell panels 20 provide the electricity to recharge the rechargeable batteries 34. The cooling device 10 has a control unit 32, which is directly connected to the rechargeable batteries 34, the solar cell panels 20, and the power mode switch 22. The power mode switch 22 instructs the control unit 32 to selectively apply power from either the rechargeable batteries 34 or from the solar cell panels 20 to the fan 36.

The entire cooling device 10 is capable of being controlled by the remote control unit 12. The remote control unit 12 is powered by batteries 36 and is equipped with a transmitter 38 which emits remote signals., Referring momentarily to FIG. 1, buttons 40 on the remote control unit 12 allow the user to selectively activate and deactivate the cooling device 10 as well as determine whether the cooling device 10 will be powered by the batteries 34 in the cooling device 10 or by the solar cell panels 20. The cooling device 10 has a remote sensor 18 which is connected to the control unit 32 of the cooling device 10, and which is capable of receiving the remote signals from the remote control unit 12. Further control may be implemented, such as controlling the fan speed, etc., as would be appreciated by those skilled in the art.

In use, the cooling device 10 is placed on the windowsill 24 beneath the rear window 26 of the automobile 50. The user carries the remote control unit 12 when leaving the automobile 50. It should be noted that activating the cooling device 10 includes at least activating the fan 36. By activating an on/off switch 42 located on the remote control unit 12, the user powers the cooling device 10 and the fan 36 located inside of the cooling device 10. This causes the fan 36 to pull warm air into the air inlet vent 14 of the cooling device 10. The warm air is circulated and/or cooled inside of the cooling device 10 and is then expelled by the fan 36 from the air outlet vent 16 into the inner compartment of the automobile 50. The user has a choice of powering the cooling device 10 with either sunlight which is absorbed by the solar cell panels 20, when ambient conditions permit, or by batteries 34 located inside of the cooling device 10, when there is not enough available sunlight. The user can choose between solar cell powering or battery powering by positioning the switch 22 on the cooling device 10, or may make this choice by pressing the appropriate buttons 40 located on the remote control unit 12.

Thus, according to the present invention, the user can activate the cooling device 10 while outside the automobile, to begin cooling and/or circulating the air before the user enters the vehicle. Activating the cooling device includes at least activating the fan. In furtherance of this goal, the remote control unit 12 may be configured to emit infrared signals, which would allow its use through the windows when immediately outside of the vehicle, or may be configured to transmit radio frequency signals, which may allow its activation and deactivation from a more substantial distance.

In conclusion, herein is presented a portable cooling unit which is selectively activated while outside the vehicle using a remote control unit and which may be used to cool the inner compartment of an automobile. The device is capable of being powered by either solar power or by batteries. The invention is illustrated by example in the drawing figures, and throughout the written description. It should be understood that numerous variations are possible, while adhering to the inventive concept. Such variations are contemplated as being a part of the present invention.

What is claimed is:

1. A portable cooling unit for cooling a passenger compartment of an automobile, comprising a cooling device and a remote control unit, said cooling device having an inlet vent, cooling means and an outlet vent, such that warm air from the passenger compartment enters the inlet vent, is cooled by the cooling means, and exits the outlet vent as cool air, the cooling device being operated by at least one power source, the cooling device capable of being activated and deactivated while outside the automobile by the remote control unit.

2. The portable cooling unit as recited in claim 1, wherein the cooling device has an upper surface and a power mode switch, and wherein there are two power sources for operating the cooling device, namely solar cell panels located on the upper surface which convert solar energy into electrical energy, and rechargeable batteries located within the cooling device, said power mode switch selectively allowing the cooling device to be powered by the solar cell panels and the batteries.

3. The portable cooling unit as recited in claim 2, wherein the solar cell panels are connected to the rechargeable batteries within the cooling device such that the solar cell panels are capable of recharging the batteries.

4. The portable cooling unit as described in claim 2, further comprising buttons on the remote control unit which allow the power source for the cooling device to be selected using the remote control unit as well as by using the power mode switch which is located on the cooling device.

5. A portable cooling method for cooling a passenger compartment of an automobile by a user prior to entering the automobile, using a portable cooling device having an inlet vent, cooling means an outlet vent, a fan and a remote sensor, and using a remote control unit, comprising the steps of:

placing the cooling device within the automobile;

raising the temperature within the automobile by ambient conditions while the automobile is left unattended;

activating the fan by the remote control unit, by transmitting a signal from the remote control unit to the remote senor;

allowing warm air from the passenger compartment to enter the cooling device through the inlet vent;

removing heat from the warm air by the cooling means;

allowing cool air to exit the cooling device through the outlet vent;

allowing the fan to circulate the cool air within the automobile; and entering the automobile by the user.

6. The portable cooling method as recited in claim 5, wherein the cooling device has two power sources, namely rechargeable batteries and solar cell panels, wherein the device has a power mode switch, wherein the step of allowing the cooling device fan to circulate air within the automobile further comprises selecting the power mode by the user such that the cooling device is selectively powered by the solar cell panels and the rechargeable batteries, and wherein while the automobile is left unattended, the batteries are recharged by the solar cell panels.

7. The portable cooling method as recited in claim 6, wherein the step of selecting the power mode is conducted by the remote control unit.

* * * * *